United States Patent
Wang

(10) Patent No.: US 6,881,372 B2
(45) Date of Patent: Apr. 19, 2005

(54) SOLID STATE POLYMERIZED MEDICAL SERVICES

(75) Inventor: Lixiao Wang, Long Lake, MN (US)

(73) Assignee: Boston Scientific SciMed, Inc., Maple Grove, MN (US)

( * ) Notice: Subject to any disclaimer, the term of this patent is extended or adjusted under 35 U.S.C. 154(b) by 169 days.

(21) Appl. No.: 10/224,764

(22) Filed: Aug. 20, 2002

(65) Prior Publication Data

US 2004/0037981 A1 Feb. 26, 2004

(51) Int. Cl.⁷ .............................. B29C 45/00
(52) U.S. Cl. ............ 264/299; 264/211.12; 264/310; 264/340; 264/328.1
(58) Field of Search ............... 264/328.1, 211.12, 264/310, 340, 299

(56) References Cited

U.S. PATENT DOCUMENTS

| | | | |
|---|---|---|---|
| 2,993,879 A | 7/1961 | Giesen et al. ............... 528/312 |
| 3,548,584 A | 12/1970 | Silverman et al. .......... 528/335 |
| 3,840,632 A | 10/1974 | Foglia et al. ................ 264/130 |
| 4,430,969 A | 2/1984 | Holtzberg et al. ....... 123/90.39 |
| 4,490,421 A | 12/1984 | Levy ............................ 428/35 |
| 4,568,736 A | 2/1986 | Curatolo et al. ............ 528/313 |
| 4,755,590 A | 7/1988 | Kubanek et al. ............ 528/503 |
| 4,948,871 A | 8/1990 | Fukuoka et al. ............. 528/481 |
| 5,204,377 A | 4/1993 | Fukawa et al. ................ 521/60 |
| 5,223,205 A * | 6/1993 | Jackowski et al. .......... 264/521 |
| 5,250,069 A * | 10/1993 | Nobuyoshi et al. ......... 606/192 |
| 5,270,086 A * | 12/1993 | Hamlin ...................... 428/35.2 |
| 5,414,057 A | 5/1995 | Campbell et al. ........... 525/462 |
| 5,717,056 A | 2/1998 | Varadarajan et al. ........ 528/196 |
| 5,773,555 A | 6/1998 | Weger et al. ................ 528/310 |
| 5,864,006 A * | 1/1999 | Ormand et al. ............. 528/196 |
| 5,955,569 A | 9/1999 | Dujari et al. ................ 528/480 |
| 6,187,895 B1 | 2/2001 | Varadarajan et al. ........ 528/196 |
| 6,239,200 B1 | 5/2001 | Kao et al. .................... 524/127 |
| 6,262,226 B1 | 7/2001 | Moore et al. ................ 528/480 |
| 6,365,702 B1 | 4/2002 | Hait et al. ................... 528/196 |

FOREIGN PATENT DOCUMENTS

EP 0 362 497 4/1990

OTHER PUBLICATIONS

U.S. Appl. No. 10/055,747, filed Jan. 23, 2002, Lixiao Wang.

* cited by examiner

Primary Examiner—Michael P. Colaianni
Assistant Examiner—Monica A. Fontaine
(74) Attorney, Agent, or Firm—Vidas, Arrett & Steinkraus

(57) ABSTRACT

Device articles such as medical devices and parts thereof are thermoformed of a thermoplastic condensable polymer composition. After thermoforming the article is subjected to a solid state polymerization step.

12 Claims, No Drawings

SOLID STATE POLYMERIZED MEDICAL SERVICES

FIELD OF THE INVENTION

The present invention relates to the field of medical devices made from thermoplastic polymers, especially devices inserted into the body, for instance tubular devices such as catheters and high strength balloons used thereon, and to polymer compositions used to prepare such devices.

BACKGROUND OF THE INVENTION

A wide variety of medical devices are made from thermoplastic polymers. Medical devices must be manufactured with greater care than general consumer products especially when inserted into the body or brought into contact with a wound or lesion. In the area of treatment devices, such as catheters, manufacturers must take great care to assure that the devices perform with an extremely high degree of reliability. At the same time there is a need to develop materials and improve processing techniques to obtain improvements in desirable properties such as tensile strength, flexibility, puncture resistance, and softness.

For many years it has been recognized that polymer molecular weight should be high in order to optimize desired strength properties. However, maximizing molecular weight increases melt viscosity at a given temperature. Moreover, the molecular weight of thermoplastic polymers typically degrades in the melt, and as melt temperature increases the reaction rates of these degradative reactions increase, especially polyesters and polyamides. Consequently there are practical limits on the molecular weights which can be used to manufacture articles by processes, such as extrusion and many molding processes, which employ a polymer melting step.

Levy, U.S. Pat. No. 4,490,421, describes use of PET of high molecular weight (intrinsic viscosity is 1.0 or higher) to produce a balloon for a medical catheter. The patent notes that the intrinsic viscosity may decrease during processing into balloons. Such a decrease is believed to be related to polymer degradation caused by extrusion temperature, moisture and the time the resin is held in the melt.

Commonly assigned copending U.S. application Ser. No. 10/055,747, filed Jan. 23, 2002, describes medical devices, such as catheters and high strength balloons used thereon, which are formed from melt compositions of thermoplastic polymers and a chain extending additive. In this process the chain extending additive is reacted in the melt stage, with the consequence that melt viscosity is increased.

U.S. Pat. No. 5,250,069, Nobuyoshi et al, describes catheter balloons made of crosslinked ethylene-vinyl acetate copolymer, by means extruding or injection molding a tube of ethylene-vinyl acetate copolymer, crosslinking the copolymer in tube form by exposure to radiation from an electron beam or a gamma-radiation source, and then blow-forming the balloon from the tube of crosslinked copolymer. A similar crosslinking method has been used with commercial catheter balloons made from polyolefin-ionomer resins such as SURLYN® polymers. For many materials, however, exposure to such high energy radiation causes polymer degradation, rather than crosslinking. Consequently, radiation crosslinking is not generally suitable as a method of increasing molecular weight in the solid state.

In preparation of commercial condensation polymers it has been known to extend molecular weight of precursor polymers, initially obtained from melt, solution or dispersion phase polymerization reactions by solid state polymerization techniques. Examples of such processes are described in U.S. Pat. No. 6,187,895, Varadarajan et al, (solid state polymerization technique for polycarbonates and polyesters); U.S. Pat. No. 6,365,702, Hait et al (polyestercarbonates produced in solid state polymerization reaction with partially crystalline polycarbonate precursor); U.S. Pat. No. 5,955,569, Dujari et al, (extended polyamide produced by heating catalyzed precursor polyamide in solid state); U.S. Pat. No. 4,755,590, Kabánek et al, (solid state postpolymerization process for ε-caprolactam based polyamides in granule form); and U.S. Pat. No. 6,239,200, Kao et al, (solid state polymerization of polyester with hindered aromatic phosphate additive). Heretofore it has not been known to extend the molecular weight of a formed device article by such a process.

SUMMARY OF THE INVENTION

The present invention relates in its broadest sense to formed device articles which are post-polymerized after they have been formed. The invention has particular application to medical device articles Other device articles to which the invention has application has utility include cell phone or lap-top computer housings or parts thereof, hinges, latches, and the like.

One aspect of the invention pertains to device articles made from thermoplastic polymers, especially condensation polymers. The invention provides articles whose molecular weight is increased after thermoforming, and a method for achieving such increase by solid state polymerization.

A further aspect of the invention is a process for forming an device article from a polymer composition comprising a condensable polymer, the process comprising:

thermoforming the article from the polymer composition; and subsequently subjecting the formed article to a solid state polymerization step.

DETAILED DESCRIPTION OF THE INVENTION

All published documents, including all US patent documents, mentioned anywhere in this application are hereby expressly incorporated herein by reference in their entirety. Any copending patent applications, mentioned anywhere in this application are also hereby expressly incorporated herein by reference in their entirety.

The invention takes advantage of the fact that condensation reactions will have a certain reaction rate at elevated temperatures, even in the solid state. Moreover, reactions producing volatile small molecule byproducts can be driven by continuous removal of the volatile byproduct. Hence, even after being thermally formed into a device or part therefor, the formed device article can still be further polymerized. Known conditions for solid state polymerization of bulk polymer granules can usually be adapted to the present invention.

The process of forming the article of the polymer composition material may be carried out in a simple manner using usual techniques and equipment, for example by extrusion, injection molding, roto-molding, or the like.

The articles of the invention may be medical devices, such as tubing, bags, catheters, and the like, or components thereof. Specific examples contemplated within the invention include tube fittings, catheter proximal shafts, guide catheters, diagnostic catheters, catheter manifolds, syringe ports, syringe bodies, shafts, spoons, needles, valves, and the like. Other device articles to which the invention has application has utility include cell phone or lap-top computer housings or parts thereof, hinges, latches, and the like. The invention is particularly advantageous for improving properties of injection molded articles which typically utilize low molecular weight polymers.

The inventive device articles in some embodiments may provide improvements in the properties of the formed device article such as tensile strength, fatigue resistance, rigidity, durability, impact resistance, puncture resistance and/or tubing kink-resistance.

The polymer compositions of the invention include at least one condensable polymer. For purposes of this application, condensable polymers include polyamides, polyesters, polycarbonates, as well as other polymers which have at least one condensable functional group on at least some of the molecules thereof. Such reactive groups may be located only at terminal ends of the polymer molecules, or may be distributed along the polymer backbone or a portion thereof.

The condensation reaction may be any number of known reactions including, for instance, esterification, transesterification, amidization, etherification, transetherification, and equivalent reactions thereto involving thiols, thioacids, and/or thioethers. The polymers can have thiol, hydroxy, alkoxy, thioether, amine and/or carboxylic acid terminal groups or pendant groups.

In the solid state polymerization reaction, water or another relatively small molecule byproduct is produced and removed during the solid state polymerization reaction. Small molecule byproducts may include, for example, phenol, a $C_{1-6}$ alcohol, a $C_{2-4}$ carboxylic acid or an ester of a $C_{1-6}$ alcohol and a $C_{2-4}$ carboxylic acid. The small molecule is determined by the condensable groups found in the polymer composition. Preferably the polymer composition is established to yield one or more of water, methanol, ethanol, isopropanol, and n-butanol as byproduct molecules.

The condensation reactions involve two condensable functional groups, usually different groups, which combine to forge a covalent linkage between polymer molecules as well as the small molecule by-product molecule. Many condensation polymers will be terminated with both groups. For instance polyesters will often have both carboxylic acid and hydroxyl groups at terminal locations. Similarly, a polyamide formed from a lactam, or formed from equal equivalents of dicarboxylic acid and of diamine, will have substantially equal numbers of terminal carboxylic acid and terminal amine functional groups. In such case the polymer composition utilized in the invention optionally may consist only of the single polymer.

If the polymer has only one of the groups necessary for the desired condensation reaction to be employed in the solid state polymerization step, a polymer blend or a polyfunctional additive molecule may be employed in the polymer composition to provide the needed functionality to participate in the solid state polymerization condensation reaction. One specific example of this embodiment would be a blend of a carboxylic acid terminated polyester or polyamide with a polyester polyol, polyether polyol, or hydroxy terminated polyurethane.

In some embodiments the second functional group may come from a small molecule additive component of the polymer composition, for instance a plasticizer, polyol or polyacid.

If at least a portion of one of the condensable polymer or the second molecule in the polymer composition has three or more condensable groups crosslinking is possible. For instance, a (meth)acrylic acid copolymer comprising three or more pendant carboxylic acid residues may be condensed with a polyol such as a polyester polyol, a polyether polyol or a polymer or copolymer of a hydroxyalkyl (meth)acrylate.

The condensable polymers may be polyesters such as polyethyleneterephthalate (PET), polybutylene terephthalate (PBT), polyethylene terephthalate/isophthalate copolymers and polyethylene naphthalate (PEN), polyethylene terephthalate/naphthalate copolymers; polyamides including nylon 12, nylon 11, nylon 10, nylon 610, nylon 6 and nylon 66; polyurethanes; block copolymers incorporating a polyester, polyamide, polyurethane and/or polyether segment; polycarbonates including polyesterpolycarbonates; any copolymers thereof; or blends comprising such polymers. Specific examples include polyamide/polyether/polyester block copolymers such as PEBAX® resins, in particular PEBAX 6333, 7033 and 7233, polyester/polyether block copolymers such as ARNITEL EM 740 from DSM Engineering Plastics and polyurethanes such as ISOPLAST 301 and PELLETHANE 2363-75D from Dow Chemical Company.

As used herein, the term copolymer refers to any polymer formed from more than one monomer. The polymers may be homopolymers, random copolymers, block copolymers or alternating copolymers. Blends of more than one terminally reactive polymer may also be employed. Blends of polymers may be employed or a blend of a polymer and a plasticizer may be employed.

(Meth)acrylic polymers (i.e. acrylic acid and/or methacrylic acid and acrylate and/or methacryate esters), especially esters of $C_{1-6}$ alcohols; vinyl acetate polymers; vinyl alcohol polymers; polysaccharides; poly(meth)acrylamide polymers; and the like, including homopolymers and copolymers thereof, are examples of polymers which can be reacted along their chain in condensation reactions.

Optionally, solid state polymerization catalysts may be included in the polymer composition. Examples of suitable catalysts for solid state polymerization of polyamides, for example, include, but are not limited to, oxygen-containing phosphorous compounds including those described in U.S. Pat. No. 4,568,736 and those described in U.S. Pat. No. 5,955,569 both of which are incorporated by reference herein in their entirety.

Phosphate type catalysts may also be employed for the solid state polymerization of polyesters. For example, a high molecular weight hindered phenolic aromatic phosphate may be employed. This type of catalyst is beneficial because it can provide the added benefit of heat stabilization as well. It serves to protect the polyester from pyrolysis and oxidization during the solid state polymerization process and also serves to catalyze the solid state polymerization. The hindered phenolic phosphates are typically employed in the range of about 0.05–5 wt %. One specific example is IRGANOX® 1425, a hindered phenolic aromatic phosphate available from Ciba Geigy.

Catalysts for the solid state polymerization of polycarbonates include but are not limited to, for example, Lewis acids and bases. Such catalysts are disclosed U.S. Pat. No. 4,948,871, U.S. Pat. No. 5,204,377, U.S. Pat. No. 5,414,057 and U.S. Pat. No. 5,717,056 each of which is incorporated by reference herein in its entirety.

Catalysts in general may be employed in the range of about 0.001 wt-% to about 5 wt-%, although this range may vary depending on the polymer, and on the type of catalyst employed.

Other optional additives include, but are not limited to, stabilizers and inhibitors of oxidative, thermal, and ultraviolet light degradation; lubricants; colorants including dyes and pigments; fillers; flame retardants; nucleating agents; crystallization accelerators or inhibitors, and so forth.

The polymer compositions may also contain other additives which may be useful in medical device balloons such as drugs, antithrombotic agents, antibiotics and other medicaments.

The formed articles may be processed to enhance crystallinity prior to solid state polymerization so as to reduce the stickiness of the material at the solid state polymerization temperature. Alternatively the articles may be provided with a crystalline polymer coating or a coating or dusting of an non-stick agent such as talc or TEFLON®.

In a typical procedure a formed device article of the polymer composition will be heated at a temperature substantially above ambient, but below the melting point of the polymer composition, for a period of at least several hours, and possibly for several days, under vacuum, flowing dry inert gas or both. In this way further condensation reactions are favored while oxidative degradation is not favored.

Depending on the temperature and the particular polymer structure, thermoplastic polymers in melt form have a limited time before they display evidence of degradation in appearance or other physical properties. Moreover, melt processing conditions, if successfully modified to encourage chain extension or crosslinking reactions will produce elevated melt viscosities. The present invention, however, recognizes that chain extending and/or crosslinking reactions can occur in the solid state, even after melt processing or other device forming processing. Consequently, melt viscosity increases are not a concern. Although reaction rates are much lower, and effective times will vary depending on the specific polymer composition, temperature and byproduct exhaustion procedure, extended reaction times can be effective to improve the properties of the polymer composition at use temperature.

In some embodiments of the invention a formed article of the polymer composition is heated at a temperature which is below melting temperature of the polymer composition, preferably by at least 10° C.–30° C., and more preferably by at least 50° C., for an extended period of time. Temperatures employed for solid state polymerization are typically in the range of about 120° C. to about 220° C., more suitably about 140° C. to about 200° C. For some polymers, the appropriate temperature for post polymerization may be higher up to about 270° C. or so. For example, for post polymerization of polycarbonates, suitable temperatures may be in the range of about 150° to about 270° C., and more suitably about 180° C. to about 250° C.

The time for the solid polymerization reaction may be varied over a wide range. This time may vary from as little as about 0.5 hours to several days. Typically the elevated temperature residence time will be between about 4 hours and about 48 hours, more typically from about 8 to about 16 hours.

The solid phase condensation may also be carried out at two different temperature levels, for example as described in U.S. Pat. No. 5,773,555 incorporated by reference herein in its entirety.

Condensation by-products are removed during the heating step(s) either by application of a vacuum to the article, or by continuously passing or flowing a dry inert gas such as dry nitrogen, argon or helium over the article, or by application of both. Removal of the by-products helps facilitate higher molecular weight condensation polymers, while the use of vacuum and/or inert gas flow discourages degradation reactions. Vacuum pressures in the range of about 0.1 mmHg (13.3 Pa) about 20 mmHg (2666 Pa) may suitably be employed.

In some embodiments the device article will preferably have at least one thickness dimension of about 13 mm or less, more preferably about 7 mm or less in order to facilitate removal of the reaction by-products.

The disclosure herein is intended to be illustrative and not exhaustive. The description will suggest many variations and alternatives to one of ordinary skill in this art. All these alternatives and variations are intended to be included within the scope of the claims, where the term "comprising" means "including, but not limited to". Those familiar with the art may recognize other equivalents to the specific embodiments described herein which equivalents are also intended to be encompassed by the claims. Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

What is claimed is:

1. A process for forming an device article from a polymer composition comprising a condensable polymer, the process comprising:

thermoforming the article from the polymer composition; and subsequently subjecting the formed article to a solid state condensation polymerization step.

2. A process as in claim 1 wherein the thermoforming step comprises injection molding, extrusion or roto-molding.

3. A process as in claim 1 wherein the device article is a member selected from the group consisting of tubing, bags, tube fittings, catheter proximal shafts, guide catheters, diagnostic catheters, catheter manifolds, syringe ports, syringe bodies, shafts, spoons, needles, valves, cell phone or lap-top computer housings or parts thereof, hinges and latches.

4. A process as in claim 1 wherein the condensable polymer is selected from the group consisting of polyesters; polyamides; polyurethane; block copolymers incorporating a polyester, polyamide, polyurethane and/or polyether segment; polycarbonates; copolymers thereof; and blends thereof.

5. A process as in claim 1 wherein the polymer composition further comprises a solid state polymerization catalyst.

6. A process as in claim 1 wherein the article formed has at least one thickness dimension of about 13 mm or less.

7. A process as in claim 1 wherein in said solid state polymerization step the device is heated for a period of about 0.5 hours to about 72 hours at a temperature of at least 120° C. and at least 10° C. below the melting point of the polymer composition.

8. A process as in claim 7 wherein said temperature is about 40° C. to about 70° C. below the melting point of the polymer composition.

9. A process as in claim 7 wherein said temperature is between about 120° C. and 270° C.

10. A process as in claim 7 wherein said temperature is between about 120° C. and about 210° C.

11. A process as in claim 1 wherein said condensable polymer includes at least one functional group selected from the group consisting of active hydrogen groups, ester, amine, ether and carboxylic acid groups.

12. A process as in claim 1 wherein said solid state polymerization step comprises heating the device at a temperature below the melt temperature of the polymer composition and above ambient temperature under vacuum, dry inert gas flow or both.

\* \* \* \* \*